United States Patent
Lin et al.

(10) Patent No.: US 8,902,857 B2
(45) Date of Patent: Dec. 2, 2014

(54) METHOD OF PERFORMING HANDOFFS IN WIRELESS LOCAL AREA NETWORKS

(75) Inventors: Chueng-Hsien Lin, Cranbury, NJ (US);
Kishore Ramachandran, Piscataway, NJ (US); Sampath Rangarajan, Bridgewater, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 514 days.

(21) Appl. No.: 11/239,319

(22) Filed: Sep. 30, 2005

(65) Prior Publication Data

US 2007/0076661 A1  Apr. 5, 2007

(51) Int. Cl.
*H04W 4/00* (2009.01)
*H04W 36/30* (2009.01)

(52) U.S. Cl.
CPC ..................................... *H04W 36/30* (2013.01)
USPC ......... 370/332; 455/450; 455/451; 455/452.1

(58) Field of Classification Search
CPC ..... H04W 36/00; H04W 36/06; H04W 36/08; H04W 36/24; H04W 36/30
USPC .......... 370/331–332, 328, 329; 455/436–437, 455/445, 450, 451, 452.1, 452.2
See application file for complete search history.

(56) References Cited

U.S. PATENT DOCUMENTS

| | | | |
|---|---|---|---|
| 6,493,322 B1* | 12/2002 | Chennakeshu et al. | 370/252 |
| 6,980,535 B2* | 12/2005 | Bennett | 370/331 |
| 2003/0133421 A1* | 7/2003 | Sundar et al. | 370/328 |
| 2005/0068928 A1* | 3/2005 | Smith et al. | 370/338 |
| 2005/0090259 A1* | 4/2005 | Jain et al. | 455/439 |
| 2006/0003769 A1* | 1/2006 | Liu et al. | 455/436 |
| 2006/0268756 A1* | 11/2006 | Wang et al. | 370/310 |
| 2012/0300746 A1* | 11/2012 | Ibrahim et al. | 370/331 |

* cited by examiner

*Primary Examiner* — Jean Gelin
(74) *Attorney, Agent, or Firm* — Harness, Dickey & Pierce

(57) ABSTRACT

In the method, communication is established between a mobile device and access points in a wireless local area network by first connecting to a first access point on a first channel. After the first connection is established, the method determines whether a second access point is available before disconnecting from the first connection. If a signal strength of the first connection drops below a signal strength threshold, the method second connects to the second access point on a second channel. The above-described method is an example of a make-before-break or soft handoff methodology.

10 Claims, 6 Drawing Sheets

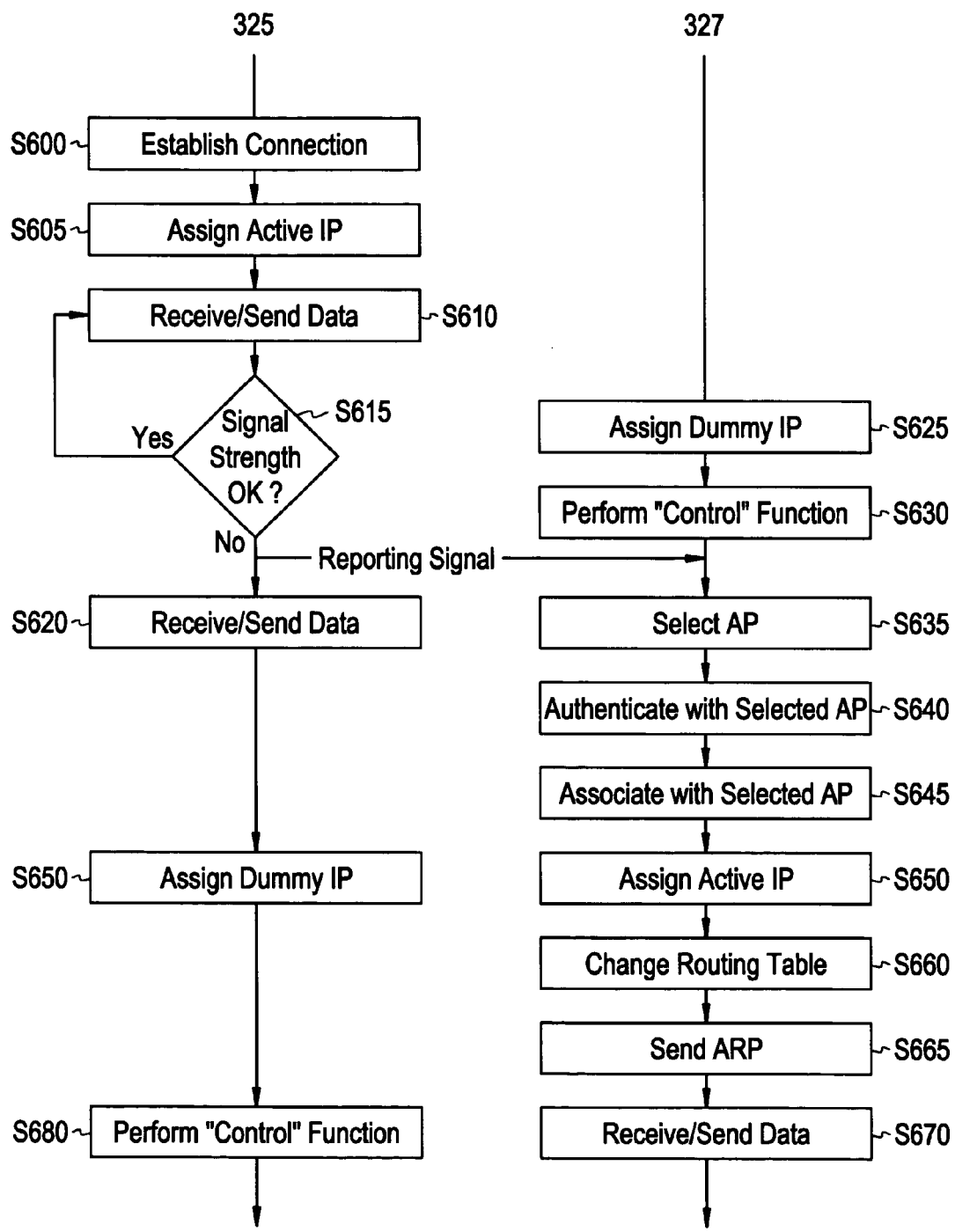

METHOD OF PERFORMING HANDOFFS IN WIRELESS LOCAL AREA NETWORKS

BACKGROUND OF THE INVENTION

1. Field of the Invention

The present invention is related generally to a method of performing handoffs in a wireless communication system, and more particularly to a method of performing handoffs in wireless local area networks (WLANs).

2. Description of the Related Art

In WLANs, mobile devices use access points (APs) (e.g., a wireless router) to connect to wired networks and communicate with other hosts. An AP is typically equipped with an interface that connects to a wired network (e.g., via an Ethernet connection) and a wireless interface (e.g., IEEE 802.11b, etc.) that communicates with mobile devices.

A coverage area of an AP operating indoors in accordance with 802.11 is limited to approximately 200 to 300 feet. Additional APs may be used to expand the coverage area. When a mobile device moves from the coverage area of a first AP to a second AP, the handling of the mobile device's communications has to be "handed off" from the first AP to the second AP. In 802.11b, handoffs occur at either layer-2 or layer-3 of a protocol stack.

For example, if the first and second APs function as MAC layer (layer-2) bridges, the handoff is performed only at layer-2 because both the first and second APs belong to the same IP subnet. In an alternative example, if the first and second APs function as IP (layer-3) routers, the first and second APs belong to different IP subnets. Thus, in addition to a layer-2 handoff, a layer-3 handoff is also necessary.

In WLANs intended for large coverage areas, seamless roaming support for mobile devices within the network is a desirable design criteria. In other words, ensuring mobility of mobile devices throughout the WLAN coverage area without any service disruptions is desired. Thus, transport and application level sessions should not be disrupted during handoffs between APs. Real-time applications (e.g., VOIP, streaming audio and/or video, etc.) require that handoffs (e.g., layer-2 and/or layer-3 handoffs) be performed fast enough to avoid service disruption. For example, disruptions in a VOIP call would be noticed if the "jitter" is above a time threshold (e.g., 50 milliseconds (ms)). Thus, to support VOIP in 802.11 WLANs and avoid service disruption (e.g., jitter), handoffs must be performed in less time than the jitter time threshold.

Conventional 802.11 WLAN networks perform layer-2 handoffs in accordance with a break-before-make approach, alternatively referred to as "hard handoff". In hard handoff, a radio card (e.g., a PCMCIA wireless 802.11b card, etc.) on the mobile device begins probing for available neighboring APs with acceptable signal strengths if a signal strength of the connection with the serving AP drops below a signal strength threshold. In an example, 802.11b WLANs include 11 channels which may be probed for available APs, where a probing of all 11 channels may take up to a second to complete. Once an acceptable AP is discovered through the probing step, the mobile device authenticates with the new AP and then associates with the new AP by performing a layer-2 association. While still significant, delays associated with the associating and authenticating steps (e.g., 10 ms) are typically less than delays associated with the probing step (e.g., up to 1 second).

The above-described probing, authenticating and associating steps may take a substantial amount of time (e.g., hundreds of milliseconds) which may vary based in part on the type of radio card being used. Further, if required, layer-3 handoffs add additional handoff latencies (e.g., on the order of hundreds of milliseconds). The delays associated with layer-2 and layer-3 handoffs are often large enough to cause service disruption in real-time applications in 802.11 WLANs.

A conventional method of reducing the above-described probing delays includes reporting the presence of neighboring APs to each mobile device in the coverage area of a 802.11 WLAN. Thus, since APs typically remain on the same channel, the probing step may be limited to channels associated with the APs reported to the mobile device. However, the above-described conventional method requires maintenance and dissemination of information to the mobile devices in the coverage area, and further requires changes to 802.11 protocols and an active management of the AP reports.

Another conventional method of reducing the probing delay is referred to as SyncScan where all APs in a 802.11 WLAN are synchronized and configured to output beacons (e.g., similar to pilot signals in cellular systems) on predetermined channels at predetermined intervals. For example, a first AP on channel 1 broadcasts a first beacon at time t, a second AP on channel 2 broadcasts a second beacon at time t+d, and so on. Mobile devices configured for operation with SyncScan switch to the predetermined channels at the predetermined times to attain AP information and then switch back to the serving AP to continue previous communications.

In 802.11 systems operating in accordance with SyncScan, the clocks at each participating AP must be synchronized with each other, which can be very difficult to achieve. Further, clock drift needs to be bounded so that the mobile device tunes to the correct channel at the correct time. Further, it is difficult to transmit beacons precisely at the predetermined times, which may require that the mobile devices operating in accordance with SyncScan tune to the channel longer than expected, thereby decreasing network efficiency. Also, while the mobile device tunes to a channel in accordance with SyncScan, data packets received from a current serving AP are lost and need to be retransmitted when the mobile device switches back to the current serving AP.

SUMMARY OF THE INVENTION

An example embodiment of the present invention is directed to a method of establishing communication between a mobile device and access points in a wireless local area network, including first connecting to a first access point on a first channel, determining whether a second access point is available before disconnecting from the first connection and second connecting to the second access point on a second channel if a signal strength of the first connection drops below a signal strength threshold.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 6 illustrates another example operation of the first and second wireless communication cards of the mobile device in FIG. 3 according to another example embodiment of the present invention.

DETAILED DESCRIPTION OF EXAMPLE EMBODIMENTS

Figure 1:
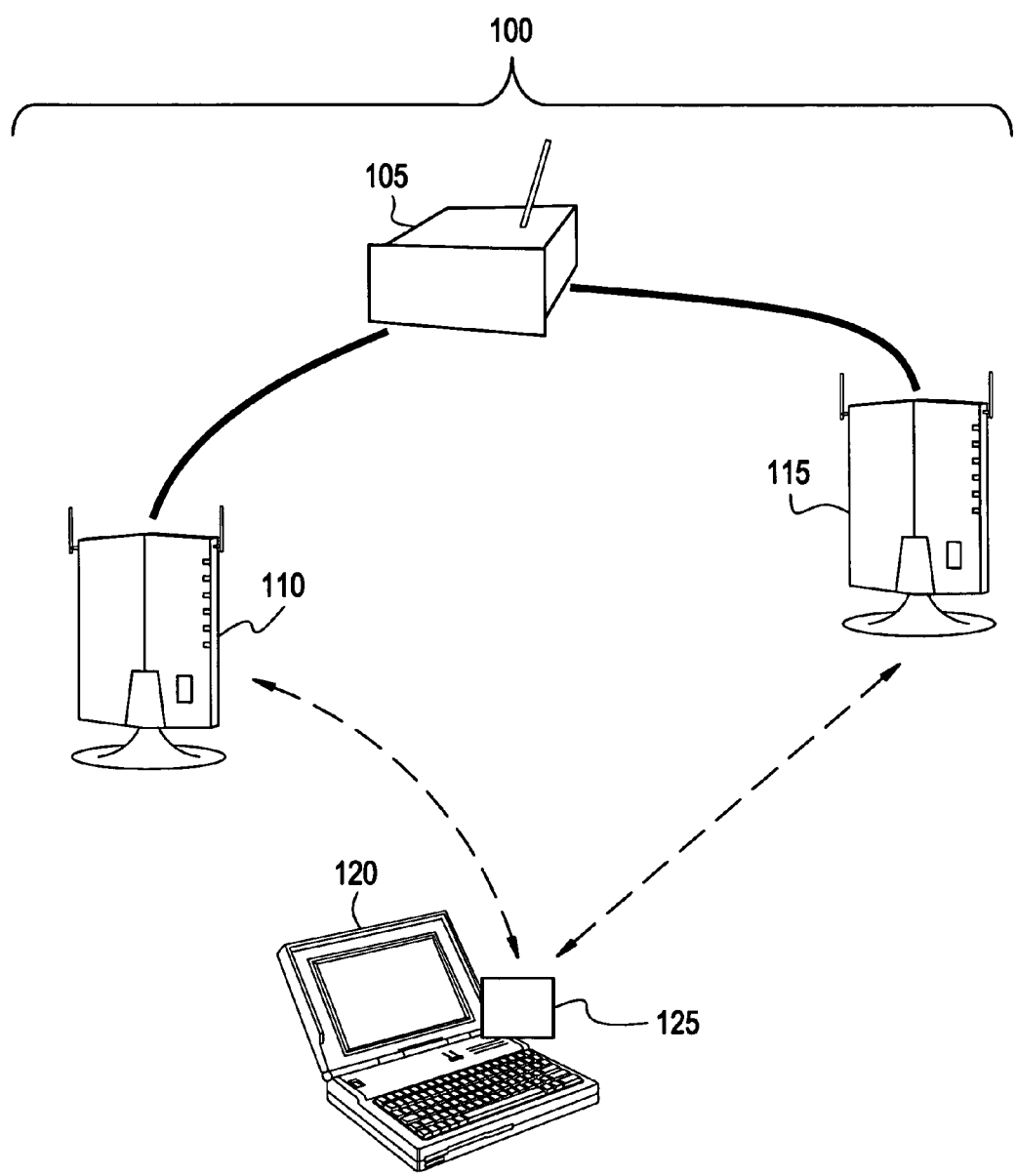
FIG. 1 illustrates a wireless local area network (WLAN) in communication with a mobile device according to an example embodiment of the present invention.

FIG. 1 illustrates a wireless local area network (WLAN) 100 in communication with a mobile device 120 according to an example embodiment of the present invention. The WLAN 100 includes a switch 105 (e.g., an Ethernet switch) connected to first and second Access Points (APs) 110 and 115 through a wired connection or landline. The mobile device 120 includes a wireless communication card 125 (e.g., a PCMCIA wireless card, etc.) for connecting to the first and second APs 110 and 115. In an example, the mobile device 120 may be a laptop, a VOIP phone, a Personal Digital Assistant (PDA) or any other device capable of communicating with the WLAN 100. The first and second APs 110 and 115 may be representative of two of a plurality of APs included in the WLAN 100. In an example, the WLAN 100 operates in accordance with a IEEE 802.11 (e.g., 802.11b) wireless protocol standard, but it will be understood that the present invention is not limited to this standard of operation.

Figure 2:
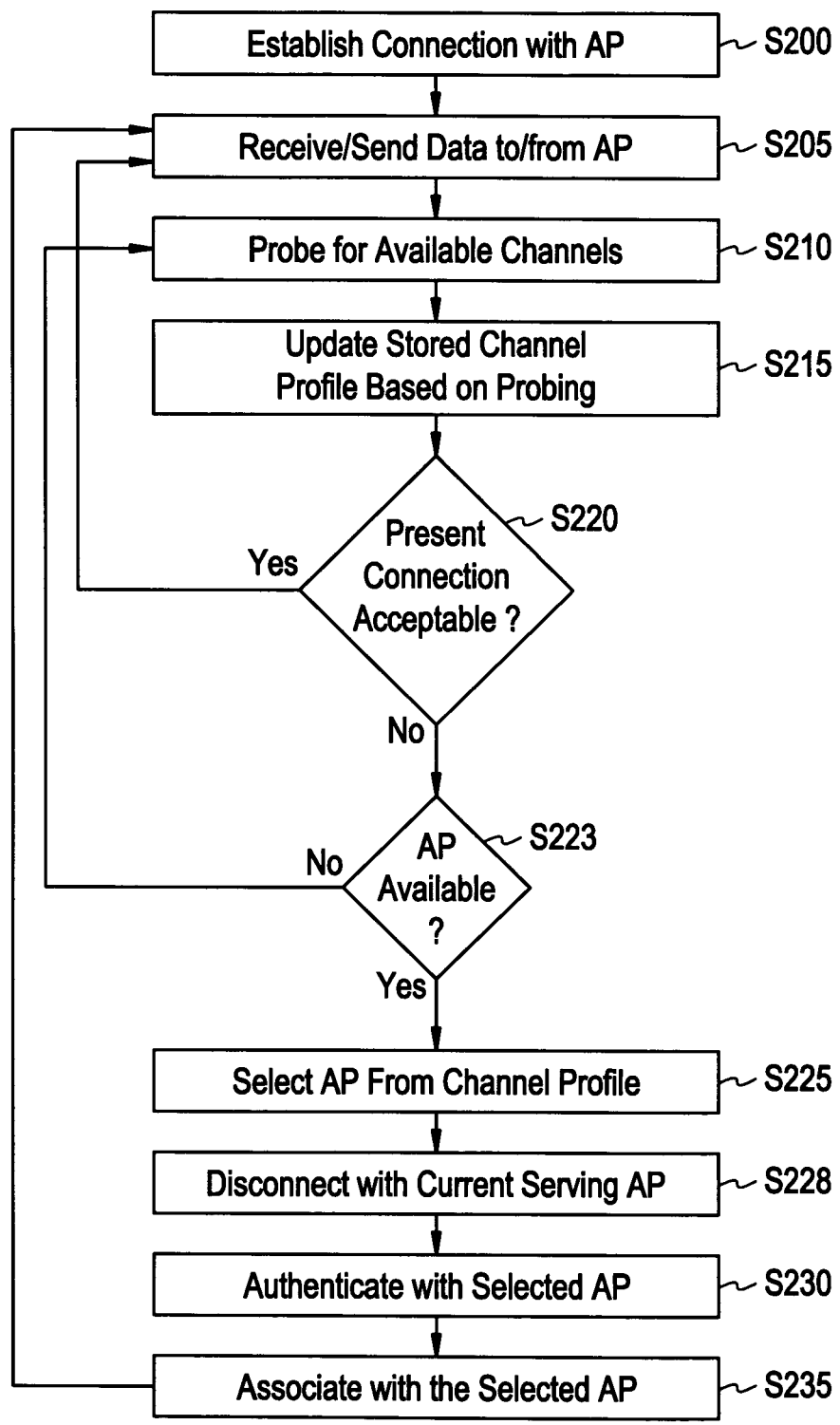
FIG. 2 illustrates an example operation of the mobile device of FIG. 1 according to an example embodiment of the present invention.

FIG. 2 illustrates an example operation of the mobile device 120 in the WLAN 100 of FIG. 1 according to an example embodiment of the present invention.

In step S200 the wireless communication card 125 of the mobile device 120 establishes an initial connection with the first AP 110. As discussed in the Background of the Invention section, the connection between the wireless communication card 125 and the AP 110 may be established through the steps of probing for available APs, authenticating with an available AP (e.g., the first AP 110) and associating with the available AP. After the connection is established in step S200, the wireless communication card 125 may receive/send data with the first AP 110 in step S205. For example, the wireless communication card 125 may send a data packet to the first AP 110, which transfers the data packet over a wired connection to the switch 105. The switch 105 transfers the data packet to a destination device (not shown), for example, over an internet connection.

In step S210, the communication card 125 of the mobile device 120 switches from the active channel (e.g., the channel of the first AP 110) to another channel and performs a probing operation by scanning- for available APs. In one example, the probing step S210 may probe a single channel. In another example, the probing step S210 may sequentially probe a number of channels. A duration or cycle of the probing step S210 may be determined by a system designer as a design parameter based on a number of factors. For example, the factors the system designer may consider include hardware considerations (e.g., a type of the communication card 125, a type of the mobile device 120, etc.), a number of channels to be scanned, the wireless communication protocol (e.g., IEEE 802.11b) used by the WLAN 100, etc.

In an example, if the wireless communication protocol is IEEE 802.11b and includes a scan of all 11 channels, the duration of the probing step S210 may take up to half a second. Further, the probing step S210 is triggered to interrupt the data transfer step 205 at an interruption interval based on a number of factors. For example, the interruption interval may be determined by an operating environment of the mobile device 120. For example, if an active set of APs (e.g., a set of APs with acceptable signal strengths) for the mobile device 120 changes rapidly (e.g., if the mobile device 120 is moving at higher speeds), the probing step S210 is performed more often and the interruption interval is reduced. In establishing the interruption interval, the system designer seeks to strike a balance between adverse effects of the probing step S210 (e.g., a loss of data packets received from the first AP 110) with the benefit of maintaining up-to-date channel information.

The information acquired in the probing step S210 is stored in a channel profile of the wireless communication card 125 in step S215. The channel profile includes a list of probed APs and associated AP information (e.g., service set identifiers (SSIDs) of the APs, a detected signal strength, an operating channel, etc.) with a signal strength above a signal strength threshold. Further, in step S215, older APs are removed if presently stored in the channel profile and not detected by the most recent probing step S210.

In step S220, the mobile device 120 determines whether the current serving AP (e.g., the first AP 110) has an acceptable signal strength. If step S220 determines the current signal strength to be acceptable (e.g., above a signal strength threshold), the process returns to step S205 where data is transferred between the mobile device 120 and the first AP 110 until interrupted by the probing step S210. Otherwise, if step S220 determines that the current signal strength is unacceptable (e.g., below a signal strength threshold), the process advances to step S223.

While step S220 is illustrated and above-described as following step S215 in FIG. 2, it is understood that step S220 may be triggered from step S205 directly, without proceeding to step S210, if the signal strength drops below the signal strength threshold during step S205.

In step 223, the wireless communication card 125 accesses the channel profile to determine whether any acceptable APs are available. If the channel profile indicates that no acceptable APs are available, the process returns to step S210 to continue probing for acceptable APs. Otherwise, if the channel profile includes at least one acceptable AP, the process advances to step S225. The wireless communication card 125 selects one of the acceptable APs (e.g., the second AP 115) indicated as having an acceptable signal strength. In an example, the selected AP may be the AP having the highest signal strength as indicated by the stored channel profile. After the AP is selected in step S225, the wireless communication card 125 disconnects from the first AP 110 in step S228.

In the example embodiment described above and other example embodiments described below, it is understood that the term "disconnect" is meant to be interpreted broadly, and may alternatively refer to an active disconnection where a mobile device breaks contact with a serving AP and a passive disconnection where a signal strength of the serving AP drops below a signal strength threshold. Passive disconnection may be indicated, for example, by a high number of lost data packets in a short period of time.

The wireless communication card 125 authenticates with the selected AP in step S230 and then associates with the selected AP in step S235. After the mobile station associates with the selected AP in step S235, the process returns to step S205 and repeats for the selected AP.

In the above-described example embodiment of the present invention, the connection established with the selected AP in steps S230 and S235 may reduce probing delays associated with new connection establishment because of the channel profile generated in step S215 based on the periodic probing steps S210. Thus, instead of performing probing after a current serving AP loses its signal strength, the channel profile provides the information which would be obtained in a probing operation and the wireless communication card 125 proceeds directly with authentication and association.

Figure 3:
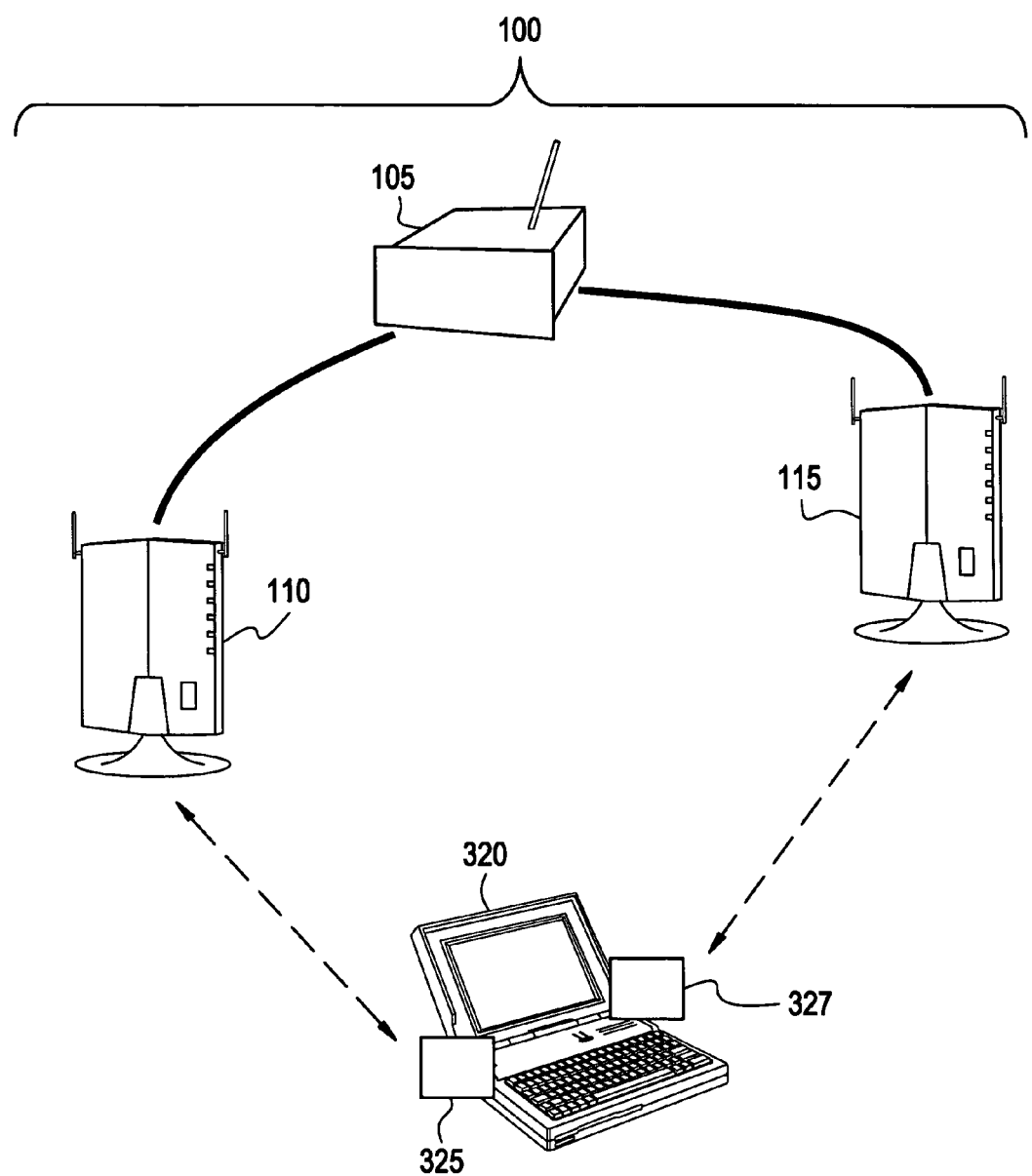
FIG. 3 illustrates the WLAN of FIG. 1 in communication with another mobile device according to another example embodiment of the present invention.

FIG. 3 illustrates the WLAN 100 of FIG. 1 in communication with a mobile device 320 according to an example embodiment of the present invention. The WLAN 100 of FIG. 3 is configured as above-described with respect to FIG. 1. The mobile device 320 includes a first wireless communication card 325 (e.g., a PCMCIA 802.11b card, etc.) and a second wireless communication card 327 (e.g., a PCMCIA 802.11b card, etc.). In an example, the first and second wireless communication cards 325 and 327 are of the same type (e.g., both PCMCIA 802.11b cards, etc.). In another example, the mobile device 320 may be a laptop, a VOIP phone, a Personal Digital Assistant (PDA) or any other device capable of communicating with the WLAN 100.

Figure 4:
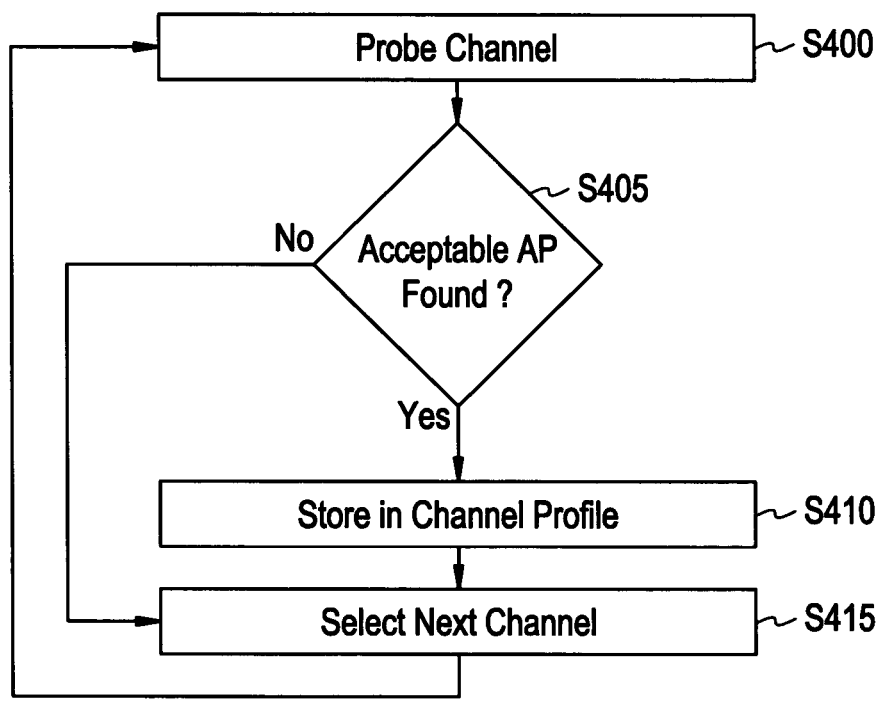
FIG. 4 illustrates an example operation of a first wireless communication card of the mobile device in FIG. 3 according to an example embodiment of the present invention.
Figure 5:
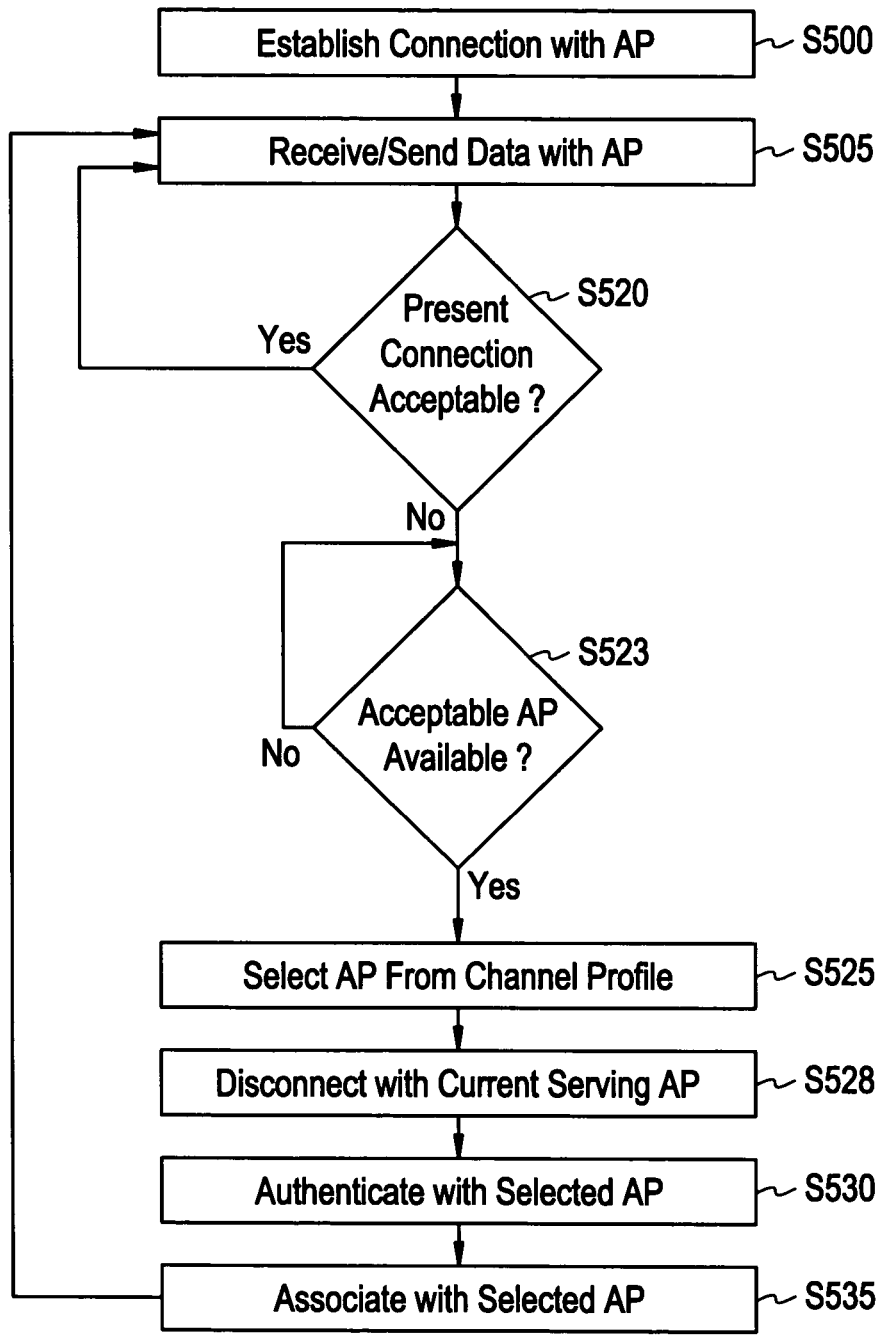
FIG. 5 illustrates an example operation of a second wireless communication card of the mobile device in FIG. 3 according to an example embodiment of the present invention.

Examples of the operation of the mobile device 320 with the WLAN 100 of FIG. 3 will now be given. FIGS. 4 and 5 are directed to an example embodiment of two-card static operation, while FIG. 6 is directed to an example embodiment of two-card dynamic operation.

Two-Card Static Operation

An example will now be given wherein the mobile device 320 of FIG. 3 operates in accordance with a two-card static operation. With respect to the two-card static operation described below with respect to FIGS. 4 and 5, the first wireless communication card 325 operates as a designated control card and the second wireless communication card 327 operates as a designated data card. In the example embodiment of FIGS. 4 and 5, the IP address of the mobile device 320 is permanently assigned to the second wireless communication card 327 (i.e., the designated data card). The processes described below with respect to FIGS. 4 and 5 operate concurrently at the first and second wireless communication cards 325 and 327, respectively.

FIG. 4 illustrates an example operation of the first wireless communication card 325 of the mobile device 320 in the WLAN 100 of FIG. 3 according to an example embodiment of the present invention.

The first wireless communication card 325 probes or scans a given channel for acceptable APs (e.g., APs with a signal strength above a signal strength threshold) in step S400. The results of the probing step S400 are analyzed in step S405 to determine whether an acceptable AP has been found. If an acceptable AP has not been found, the process advances to step S415. Otherwise, if at least one acceptable has been found in the probed channel, the process advances to step S410.

In step S410, the first wireless communication card 325 updates a channel profile stored in the mobile device 320 with the results of the probing step S400. For example, the information stored in the channel profile in step S410 may include information directed to an acceptable AP (e.g., an SSID of the AP, a detected signal strength, an operating channel, etc.). Further, the updating step S410 may include deleting previously stored AP information associated with the probed channel in S400 if the probing step S400 indicates that the previously stored AP information is no longer accurate (e.g., because the mobile device 320 has been moved away from the previously stored AP).

After the AP information is updated in step S410, the first wireless communication card 325 selects a new channel to probe in step S415. In an example, the selected channel is the next channel in a sequence of channels, where channel 2 follows channel 1, channel 3 follows channel 2, and so on. After selecting the next channel in step S415, the process returns to the probing step S400 and probes the selected channel.

FIG. 5 illustrates an example operation of the second wireless communication card 327 of the mobile device 320 in the WLAN 100 of FIG. 3 according to an example embodiment of the present invention.

The second communication card 327 establishes an initial connection with the first AP 110 in step S500. In an example, the initial connection established between the second wireless communication card 327 and the first AP 110 in step S500 may be established as will be described below with respect to steps S525, S530 and S535. After the connection is established in step S500, the second communication card 327 may receive/send data with the first AP 110 in step S505. For example, the second communication card 327 may send a data packet to the first AP 110, which transfers a data packet over a wired connection to the switch 105. The switch 105 transfers the data packet to a destination device (not shown), for example, over an internet connection.

In step S520, the second communication card 327 determines whether the current serving AP (e.g., established in step S500) has an acceptable signal strength. If step S520 determines the current signal strength to be acceptable (e.g., above a signal strength threshold), the process returns to step S505 where data is transferred between the second communication card 327 and the first AP 110. Otherwise, if step S520 determines that the current signal strength is unacceptable (e.g., below a signal strength threshold), the process advances to step S523.

In step S523, the second wireless communication card accesses the channel profile generated by the first wireless communication card 325 in the process described above with respect to FIG. 4 to determine whether any acceptable APs are available. If the channel profile indicates that no acceptable APs are available, the process repeats step S523 until the channel profile is updated so as to include at least one acceptable AP. Otherwise, if the channel profile includes at least one acceptable AP, the process advances to step S525.

In step S525, the second wireless communication card 327 selects one of the available APs (e.g., the second AP 115) indicated as having an acceptable signal strength in the stored channel profile. In an example, the selected AP may be the AP having the highest signal strength as indicated by the stored channel profile. The second wireless communication card 327 disconnects from the first AP 110 in step S525 after the selecting step S525.

The second wireless communication card 327 authenticates with the selected AP from step S525 in step S530 and then associates with the selected AP in step S535. After the second wireless communication card 327 associates with the selected AP in step S535, the process returns to step S505 and repeats for the selected AP.

In the example embodiment of the present invention described above with respect to FIGS. 3, 4 and 5, the connection established by the second wireless communication card 327 with the selected AP in steps S530 and S535 of FIG. 5 may have reduced probing delays because of the channel profile generated by the first wireless communication card 325 in the process of FIG. 4. Thus, instead of performing probing after a current serving AP loses its signal strength, the channel profile generated by the first wireless communication card 325 provides the information which would be obtained in a probing operation and the second wireless communication card 327 proceeds directly with authentication and association.

Two-Card Dynamic Operation

An example will now be given wherein the mobile device 320 in FIG. 3 operates in accordance with a two-card dynamic operation.

FIG. 6 illustrates another example operation of the first and second wireless communication cards 325 and 327 of the mobile device 320 in the WLAN 100 of FIG. 3 according to another example embodiment of the present invention. With respect to the two-card dynamic operation described below with respect to FIG. 6, the first and second wireless communication cards 325 and 327 at times operate as a data card and a control card, respectively, and at other times operate as a control card and a data card, respectively.

The first wireless communication card 325 establishes an initial connection with the first AP 110 in step S600. In an example, the initial connection established between the first wireless communication card 325 and the first AP 110 in step S600 may be established as will be described below with respect to the second wireless communication card 327 in steps S635, S640, S645 and S660. After the connection is established in step S600, an active IP address of the mobile device 320 is assigned to the first wireless communication card 325 in step S605 and the first wireless communication card 325 may receive/send data with the first AP 110 in step S610. For example, the first wireless communication card 325 may send a data packet to the first AP 110, which transfers the data packet over a wired connection to the switch 105. The switch 105 transfers the data packet to a destination device (not shown), for example, over an internet connection.

In step S615, the first wireless communication card 325 determines whether the current serving AP (e.g., established in step S600) has an acceptable signal strength. If step S615 determines the current signal strength to be acceptable (e.g., above a signal strength threshold), the process returns to step S610 where data is transferred between the first wireless communication card 325 and the first AP 110. Otherwise, if step S615 determines that the current signal strength is unacceptable (e.g., below a signal strength threshold), the first wireless communication card 325 sends a reporting signal to the second wireless communication card 327 reporting that the first AP 110 is no longer acceptable and the process advances to step S620. In step S620, the first wireless communication card 325 remains connected to and communicating data with the first AP 110.

While the first wireless communication card 325 acts as a data card and communicates with the first AP 110 in steps S600-S615, the second wireless communication card 327 functions as a control card. In step S625, when the mobile station 320 assigns the active IP address to the first wireless communication card 325 in step S605, the second wireless communication card 327 is assigned a "dummy" IP address, or an IP address not used to actively communicate with external devices, in step S625. After the dummy IP address is assigned in step S625, the second wireless communication card 327 operates as described above with respect to FIG. 4 and functions as a control card in step S630. In step S630, the second wireless communication card 327 repeatedly performs the steps of S400-S415 of FIG. 4 until receiving a reporting signal from the first wireless communication card 325.

After receiving the reporting signal from the first wireless communication card 325, the second wireless communication card selects an acceptable AP (e.g., the second AP 115) from the stored channel profiles in step S635 as in step S528 of FIG. 5, authenticates with the selected AP in step S640 as in step S530 of FIG. 5 and associates with the selected AP in step S645 as in step S535 of FIG. 5. After the associating step S645, the IP addresses of the first and second wireless communication cards 325 and 327 are swapped in steps S650 and S655. In step S650, the first wireless communication card 325 is assigned a dummy address. In step S655, the second wireless communication card 327 is assigned the active IP address for the mobile device 320. After the IP swap of steps S650 and S655, the second wireless communication card 327 effectively becomes the data card. However, the first wireless communication card 325 does not yet become the control card.

After the second wireless communication card 327 is assigned the active IP address of the mobile device 320, the routing table at the mobile device 320 is changed so that outgoing data packets are sent through the second wireless communication card 327. In step S665, a gratuitous Address Resolution Protocol (ARP) packet is sent to the selected AP (e.g., the second AP 115) from the second wireless communication card 327 to populate an ARP cache so that data packets sent to the mobile device 320 are forwarded through the selected AP to the second wireless communication card 327. If the selected AP functions as a bridge, as illustrated in the example embodiment of FIGS. 1 and 3, the ARP cache is stored at the switch 105. In an example, the selected AP forwards the ARP packet to the switch 105 if the selected AP functions as a bridge. In another example embodiment of the present invention, if the selected AP functions as a router, the ARP cache is stored at the selected AP. In this example, the selected AP may not forward the ARP packet to the switch 105 if the selected AP includes routing functionality. After the ARP is sent, the second wireless communication card 327 sends and receives data packets to/from the selected AP (e.g., the second AP 115) in step S670.

After the step S670, the first wireless communication card 325 functions as a control card and operates in accordance with the process described above with respect to FIG. 4 in step S680. In step S680, as in step S630 with respect to the second wireless communication card 327, the first wireless communication card 325 repeatedly performs the steps of S400-S415 of FIG. 4 until receiving a reporting signal (not shown) indicating that the selected AP's signal strength has dropped below the signal strength threshold from the second wireless communication card 327.

In the example embodiment of the present invention described above with respect to FIGS. 3 and 6, the first and second wireless communication cards 325 and 327 may swap control and data functionality such that no delays due to probing, authenticating and/or associating are present during handoff. Thus, the first wireless communication card 325 at step S680 is in a position in the process of FIG. 6 similar to the second wireless communication card 327 at step S630. Likewise, the second wireless communication card 327 at step S670 is in a position in the process of FIG. 6 similar to the first wireless communication card at step S610 (e.g., where the signal strength of the serving AP is monitored in step S615 until the signal strength drops below the signal strength threshold).

Example embodiments of the present invention being thus described, it will be obvious that the same may be varied in many ways. For example, while generally above-described with respect to 802.11 WLANs, it is understood that other example embodiments of the present invention may be applied to WLANs operating in accordance with any wireless communication protocol. Such variations are not to be regarded as a departure from the spirit and scope of the exemplary embodiments of the invention, and all such modifications as would be obvious to one skilled in the art are intended to be included within the scope of the invention.

We claim:

1. A method of establishing communication between a mobile device and access points in a wireless local area network data communication mode, comprising:
   first connecting, at the mobile device, to a first access point on a first data channel;
   probing, at the mobile device, channels for a second access point on a second data channel, while in the data communication mode with the first access point, before disconnecting from the first access point, commencement of the probing step occurring without limiting a number of probed channels by an a priori listing of candidate channels;
   receiving, by the mobile device, at least a portion of channel profile information from the second access point;
   storing, by the mobile device, the channel profile information.

2. The method of claim 1, further comprising:
   second connecting to the second access point if a signal strength of the first connection drops below a signal strength threshold.

3. A method of establishing communication between a mobile device and access points in a wireless local area network data communication mode, comprising:
   first connecting, by the mobile device, to a first access point on a first data channel;
   performing, by the mobile device, data communication with the first access point;
   periodically probing, by the mobile device, channels for a second access point on a second data channel, while continuing data communication with the first access point, commencement of the probing step occurring without limiting a number of probed channels by an a priori listing of candidate channels;
   receiving, by the mobile device, at least a portion of channel profile information from the second access point;
   switching back to the first data channel after a given duration of time from the probing step;
   storing, by the mobile device, the channel profile information; and
   second connecting, by the mobile device, to the second access point if a signal strength of the first data channel drops below a signal strength threshold.

4. The method of claim 3, wherein the first connecting step comprises:
   determining that the first access point is acceptable;
   authenticating with the first access point; and
   associating with the first access point.

5. The method of claim 3, wherein the given duration is based on at least one of hardware considerations, a number of channels to be probed among the at least one channel and a wireless communication protocol of the wireless local area network.

6. The method of claim 3, wherein the periodic switching is performed at a given interval.

7. The method of claim 6, wherein the given interval is selected based on an operating environment of the mobile device.

8. The method of claim 3, further comprising:
   disconnecting from the first access point before performing the second connecting step.

9. The method of claim 3, further comprising:
   disconnecting from the first access point after performing the second connecting step.

10. The method of claim 3, wherein the wireless local area network operates in accordance with 802.11.

* * * * *